US006576107B2

(12) United States Patent
Thompson

(10) Patent No.: US 6,576,107 B2
(45) Date of Patent: Jun. 10, 2003

(54) ELECTROSTATIC FILTER FOR DIELECTRIC FLUID

(76) Inventor: Donald E. Thompson, 2520 Avenue K, Suite 700263, Plano, TX (US) 75074

( * ) Notice: Subject to any disclaimer, the term of this patent is extended or adjusted under 35 U.S.C. 154(b) by 0 days.

(21) Appl. No.: 09/903,354

(22) Filed: Jul. 11, 2001

(65) Prior Publication Data

US 2001/0037941 A1 Nov. 8, 2001

Related U.S. Application Data

(62) Division of application No. 09/568,173, filed on May 9, 2000, now Pat. No. 6,284,118, which is a division of application No. 09/311,943, filed on May 14, 1999, now Pat. No. 6,129,829.

(51) Int. Cl.[7] .............................. B03C 5/00; B03C 5/02
(52) U.S. Cl. ...................... 204/572; 204/562; 204/665; 204/666
(58) Field of Search ................................ 204/572, 562, 204/665, 666

(56) References Cited

U.S. PATENT DOCUMENTS 3,852,178 A * 12/1974 Griswold ................... 204/559
3,891,528 A * 6/1975 Griswold ................... 204/562
4,579,637 A 4/1986 Jaisinghani et al. ........ 204/186
4,587,992 A 5/1986 Thompson .................. 137/576
4,594,138 A 6/1986 Thompson .................. 204/302
4,961,845 A * 10/1990 Dawson et al. ............. 184/108
5,332,485 A 7/1994 Thompson .................. 204/302
5,630,926 A 5/1997 Thompson .................. 204/665
5,785,834 A * 7/1998 Thompson .................. 204/560
5,954,933 A * 9/1999 Ingalls et al. ............... 204/557

* cited by examiner

Primary Examiner—James J. Seidleck
Assistant Examiner—Thao Tran
(74) Attorney, Agent, or Firm—F. Lindsay Scott

(57) ABSTRACT

An electrostatic filter for removing contaminants from a dielectric fluid when the filter comprises a plurality of electrically conductive plates positioned in a housing and having filter media disposed between the plates so that during the operation of the filters, fluid flows axially through the media between the electrode plates and into a central recovery zone and is discharged from the filter. A replaceable filter cartridge, a method for removing contaminants from a dielectric fluid using the filter, a filtration system for removing both water and other contaminants from a dielectric fluid using the filter in combination with a water-removal filter and a system for maintaining a supply of filter dielectric fluid for a dielectric fluid user on a continuous basis are disclosed.

6 Claims, 6 Drawing Sheets

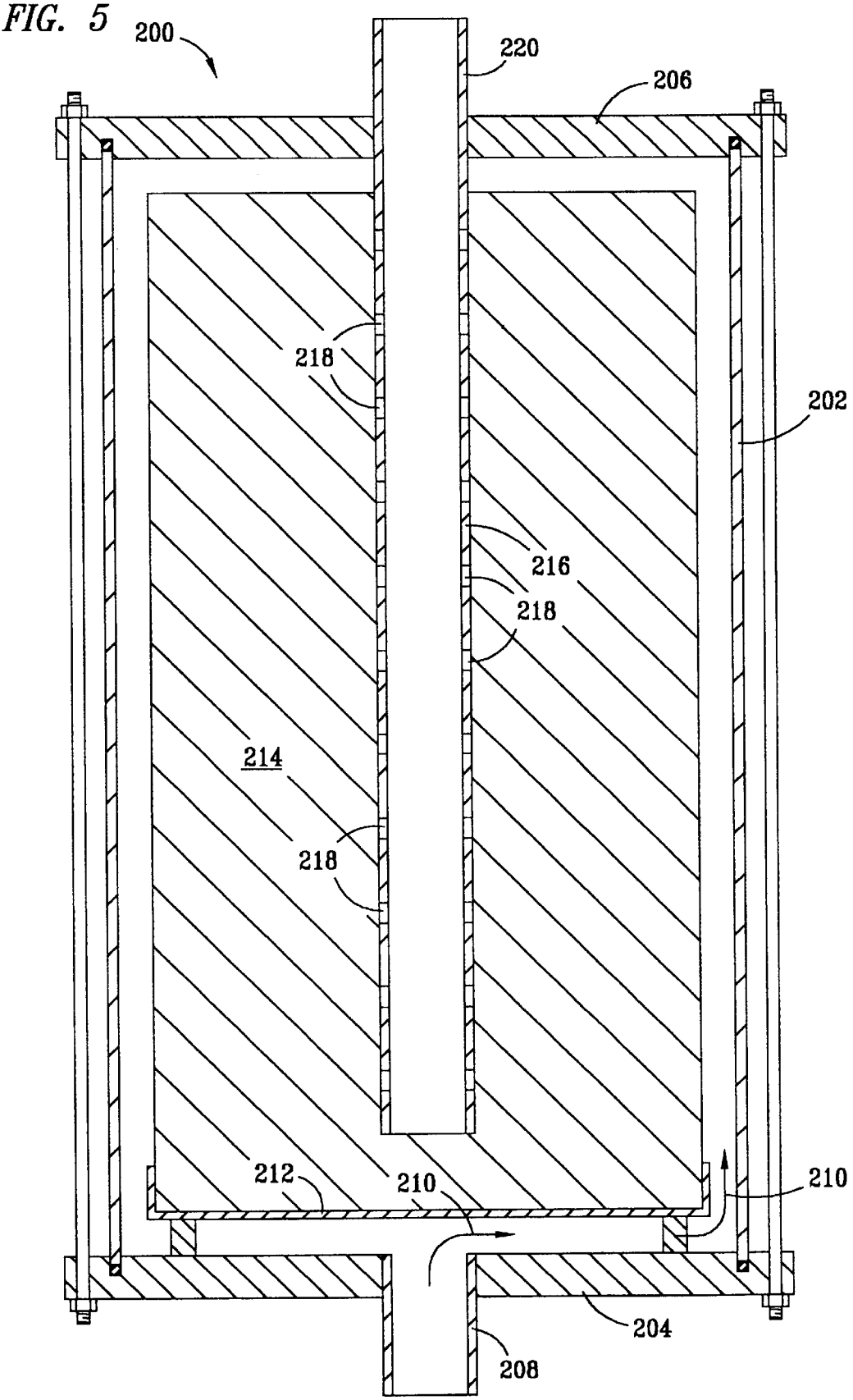

ELECTROSTATIC FILTER FOR DIELECTRIC FLUID

This is a division of application Ser. No. 09/568,173, filed May 9, 2000, now U.S. Pat. No. 6,284,118 which is a divisional of application Ser. No. 09/311,943, now U.S. Pat No. 6,129,829, filed on May 14, 1999.

BACKGROUND OF THE INVENTION

1. Field of the Invention

This invention relates to a filter system and method for the removal of contaminants from a dielectric fluid. This invention further relates to a filter system for the removal of both water and other contaminates from a dielectric fluid using an electrostatic filter and a water-removal filter, and a method for using the filter system to supply a continuous supply of filtered dielectric fluid.

2. Description of the Prior Art

Prior art filters include filters for removing particulates from various dielectric fluids such as oils and hydraulic fluids by employing mechanical filtration. When mechanical filtration is employed to filter very fine particles, i.e., below about 3 microns, difficulties may be encountered because these relatively small particles may require large bulk and volume filters to avoid significant system pressure drops caused by the necessarily small openings in the filter media. Alternatives to mechanical filters for fine particle filtration of dielectric fluids include electrostatic filters where the fluid is passed through a number of perforated electrodes which are alternately charged with relatively high positive and negative direct current (D.C.) voltages. Porous filter material is placed between the electrodes for trapping the particulates and extends across the entire internal cross-sectional area of the filter.

It appears that the particulates when subjected to the electric fields created by the application of voltage to the electrodes are captured by one of two possible ways. The filter media itself may be charged, with the particulates being attracted to the filter media itself. More likely, however, the particulates are charged either positively or negatively depending on their composition and the oppositely charged particles will be attracted to each other and eventually floc together into clumps which will be large enough to be trapped in the filter media. When enough clumps form to effectively block the filter or produce an undesirable pressure drop, the filter media must be replaced.

Electrostatic filters of this type are shown in U.S. Pat. No. 5,332,485 issued Jul. 26, 1994, to Donald E. Thompson, U.S. Pat. No. 4,594,138 issued Jun. 10, 1986, to Donald E. Thompson, and U.S. Pat. No. 5,630,926 issued May 20, 1997, to Donald E. Thompson. These patents are hereby incorporated in their entirety by reference.

These patents disclose filters where the flow of the contaminated fluid through the filter is axial and utilize perforated electrodes separated by layers of filter media. The electrodes are alternately oppositely charged with the filtration process taking place by flowing the contaminated fluid upwardly through perforations in the electrodes and the filter media between the plates.

While filters of this type may be effective, they have certain drawbacks. The amount of surface area available for filtration is limited to the internal cross-sectional area of the inner chamber of the filter housing. Accordingly, if water or other contaminates reach a level sufficient to permit short circuits between the perforated electrodes, plug the filter media and the like in the first layer of filter media, the filter is rendered less effective, may require a much higher pressure and may require replacement of the filter cartridge. This is a very undesirable result since the bulk of the cartridge may remain relatively uncontaminated and could be used for a longer period were not the cross-sectional part of the media nearest the inlet overloaded with contamination. It is a further disadvantage that the diameter of such filters must be increased to increase the internal cross-sectional area. This can result in a very large diameter filter or a large number of filters when higher flow rate is desired.

Accordingly, a continuing effort has been directed to the development of improved electrostatic filters.

SUMMARY OF THE INVENTION

According to the present invention, an electrostatic filter is provided for removing contaminants from a dielectric fluid wherein the filter comprises:

a) a housing enclosing an inner chamber and having an outer wall, a first end and a second end;

b) a plurality of electrically conductive electrode plates connected in parallel having an outside and supported in a spaced apart position in the inner chamber and alternately oppositely chargeable with a positive or a negative direct current electrical charge;

c) an inlet fluid passageway formed between the outside of the electrode plates and the inside of the outer wall;

d) a filtered fluid passageway axially positioned through at least a portion of the electrode plates;

e) a fluid inlet into the inner chamber and in fluid communication with the inlet fluid passageway;

f) a plurality of filter media sections positioned between adjacent electrode plates whereby the fluid flows from the inlet fluid passageway radially between the electrode plates and through the filter media sections to the filtered fluid passageway; and, g) a filtered fluid outlet in fluid communication with the filtered fluid passageway.

The invention further comprises a replaceable filter cartridge.

The invention further comprises a method for removing contaminants from a dielectric fluid using the electrostatic filter of the present invention.

The invention further comprises a filtration system for removing both water and other contaminants from a dielectric fluid using a water-removal filter in combination with the filter of the present invention.

In a further embodiment, the present invention also comprises a system for maintaining a supply of filtered dielectric fluid for a dielectric fluid user, which requires filtered dielectric fluid on a continuous basis.

BRIEF DESCRIPTION OF THE DRAWINGS

FIG. 5 is a schematic diagram of a fluted paper filter for the removal of water from a water-containing dielectric fluid;

DESCRIPTION OF PREFERRED EMBODIMENTS

In the discussion of the Figures, the same numbers will be used to refer to the same or similar components throughout. Further, the various pumps, valves, electrical sources, switches and the like necessary to achieve the flows and voltages discussed have not been shown in the interest of conciseness.

Figure 1:
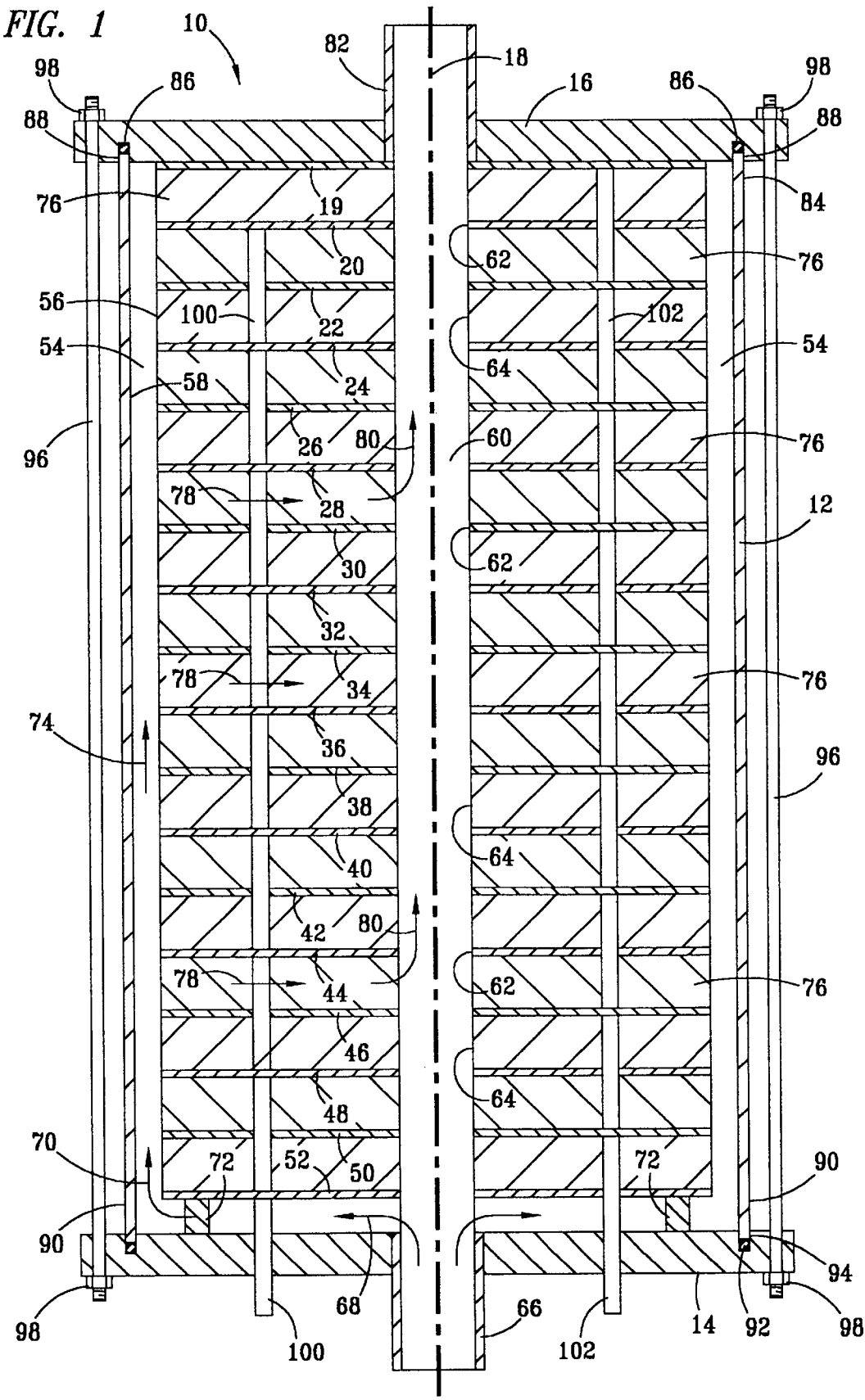
FIG. 1 is a schematic diagram of an embodiment of the electrostatic filter of the present invention.

FIG. 1 shows a schematic diagram of an electrostatic filter 10 of the present invention. Filter 10 comprises an outer wall 12 closed by a first end 14 and a second end 16 to provide an inner chamber. Outer wall 12 is desirably cylindrical and symmetrical about an axis 18. A plurality of electrode plates 19–52 are positioned in filter 10 as shown. The plates are separated by filter media sections 76, only a portion of which are numbered.

Filter media sections are desirably a material such as a reticulated foam, which becomes charged in the vicinity of the electrode plates. These foam pores are of a size selected to eliminate the desired particulates. The term "reticulated" is used to refer to foam which has continuous passageways therethrough. The bottom electrode plate 52 as shown is positioned on supports 72 which permit flow between the bottom of bottom electrode plate 52 and first end 14 and above first end 14. An inlet fluid passageway 54 is shown. This passageway is formed as an annular space between an outside 56 of the electrode plates and media sections and an inside 58 of outer wall 12. Similarly, a filtered fluid passageway 60 is formed by an inside 62 of the openings in the electrode plates and an inside 64 of openings in the media material. A fluid inlet 66 is provided to admit contaminated dielectric fluid into filter 10. The flow though inlet 66 is shown by arrows 68 with flow continuing beneath bottom electrode plate 52 as shown by arrow 70 upwardly into inlet fluid passageway 54 as shown by arrows 74. This results in positioning the fluid under the inlet pressure around the outside of the electrode plates and the filter media sections 76. The flow of fluid during operation of the filter is shown by arrows 78 through the filter media sections 76 radially inward to filtered fluid passageway 60 and through passageway 60 as shown by the arrows 80. Filtered fluid then flows upwardly through filtered fluid passageway 60 and out of the filter unit through a filtered fluid outlet 82.

In the construction of the filter unit, an upper end 84 of outer wall 12 is matingly joined to second end 16 by way of a slot 88 with sealing engagement being assured by an O-ring 86. Similarly, a lower end 90 of outer wall 12 is positioned in a slot 94 in first end 14 with sealing engagement being assured by an O-ring 92. The assembly is then maintained in position by a bolt 96, which extends from extensions of first end 14 and second end 16 outside outer wall 12 and a nut 98. A plurality of bolts may be used as necessary to maintain first and second ends 14 and 16 in sealing engagement with outer wall 12.

The construction of an inner chamber can be accomplished by a variety of methods known to those skilled in the art. The embodiments shown are accordingly illustrative only.

A positive electrical contact system 100 and a negative electrical contact system 102 are shown schematically. These systems are shown only generally in FIG. 1 and will be discussed further below.

Accordingly, in the operation of the filter, the electrode plates are alternately positively and negatively charged. Flow enters the filter through line 66, passes into and upward in the inlet fluid passageway 54 and then flows through the filter media between the charged electrode plates to the central filtered fluid passageway 60 where it is recovered and passed from the filter. The electrode plates are preferably not perforated although electrode screens and other suitable conductive material of this type can be used, but in either event the flow is radially inward through the filter media between the electrode plates.

This filter construction permits an increase in the available area in the filter by using the outer surface of the exterior of the electrode plates and of the filter media rather than the cross-sectional area of the filter. The total filter surface area can be enlarged by increasing the height of the filter. Much greater increases in available filtration area can be achieved with minimal changes, or no change, in the cross-sectional area of the filter unit. Further the filtration is more uniformly distributed throughout the body of the filter media so that the filter is much less readily contaminated than were all of the fluid passed directly into the filter media directly above the first electrode plate. Accordingly, it is believed that filters of this design will provide greater filtration capacity and greater filter life than those discussed previously in the background of the invention.

Figure 2:
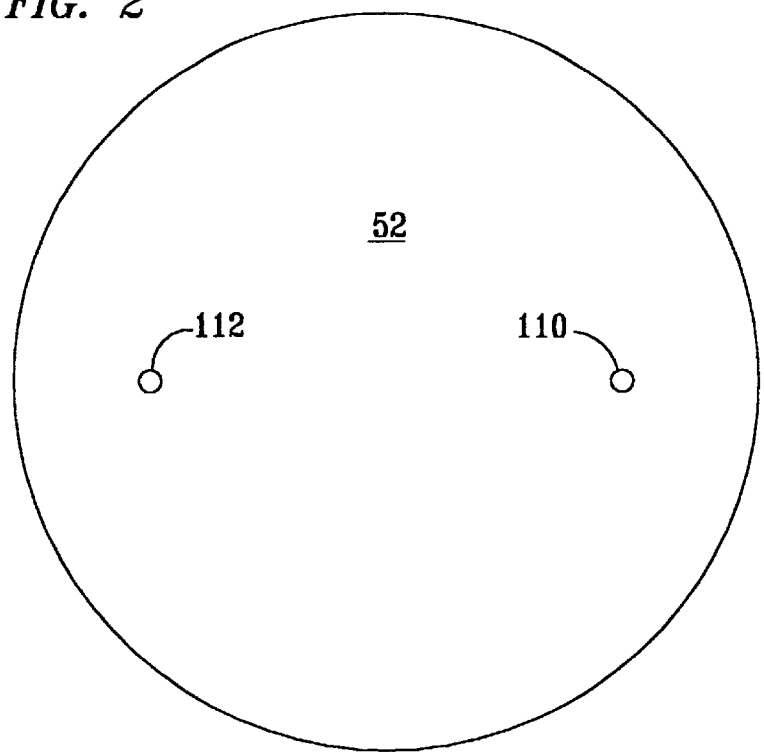
FIG. 2 is a top view of an electrode plate used in the electrostatic filter of FIG. 1.

FIG. 2 shows a top view of bottom electrode plate 52. This electrode plate does not have a central opening as do the other electrode plates. This electrode plate does have two openings 110 and 112 which are designed to permit the passage of an insulator tube which will be discussed in more detail in conjunction with FIG. 4.

Figure 3:
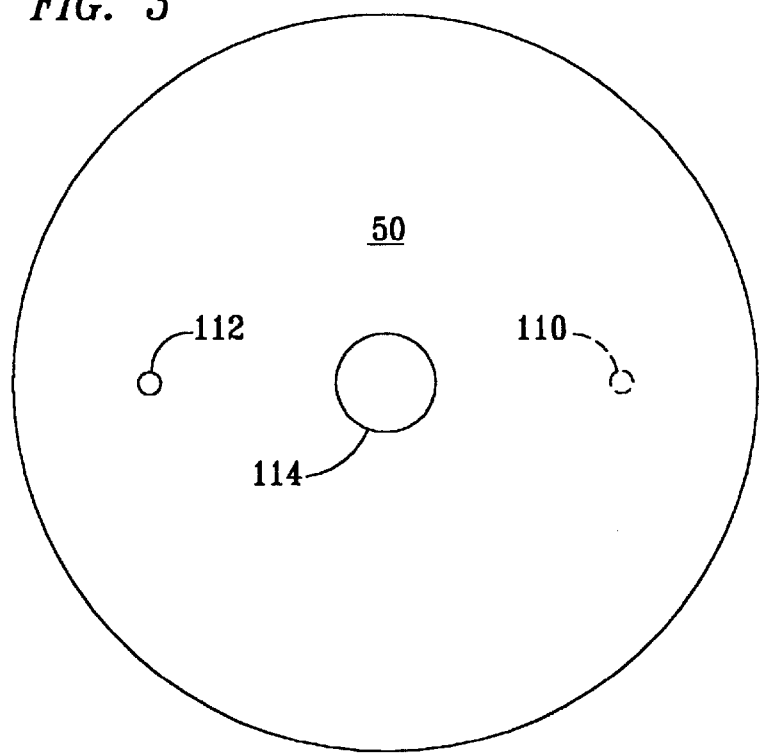
FIG. 3 is a top view of another electrode plate used in the electrostatic filter of FIG. 1.

FIG. 3 shows a top view of an electrode plate 50. Electrode plate 50 has a center hole 114 which will form a portion of filtered fluid passageway 60. Electrode plate 50 also has an opening 112 to accommodate an insulator tube and an opening 110 to accommodate a T-nut conductor. Opening 110 is shown as a dotted opening, although this opening is present in electrode plate 50. In subsequent electrode plates above electrode plate 50, only one insulated tube will be present. The opening will be on alternate sides, but only one opening will be present.

Alternatively, electrode plate 52 could include openings for additional fasteners to secure electrode plate 52 to first end 14 to secure the components of a filter cartridge or the like. Further, all of the electrode plates could if desired contain additional holes to permit the passage of small restraining rods to retain the electrode plates and filter media in position prior to installation in filter 10.

Figure 4:
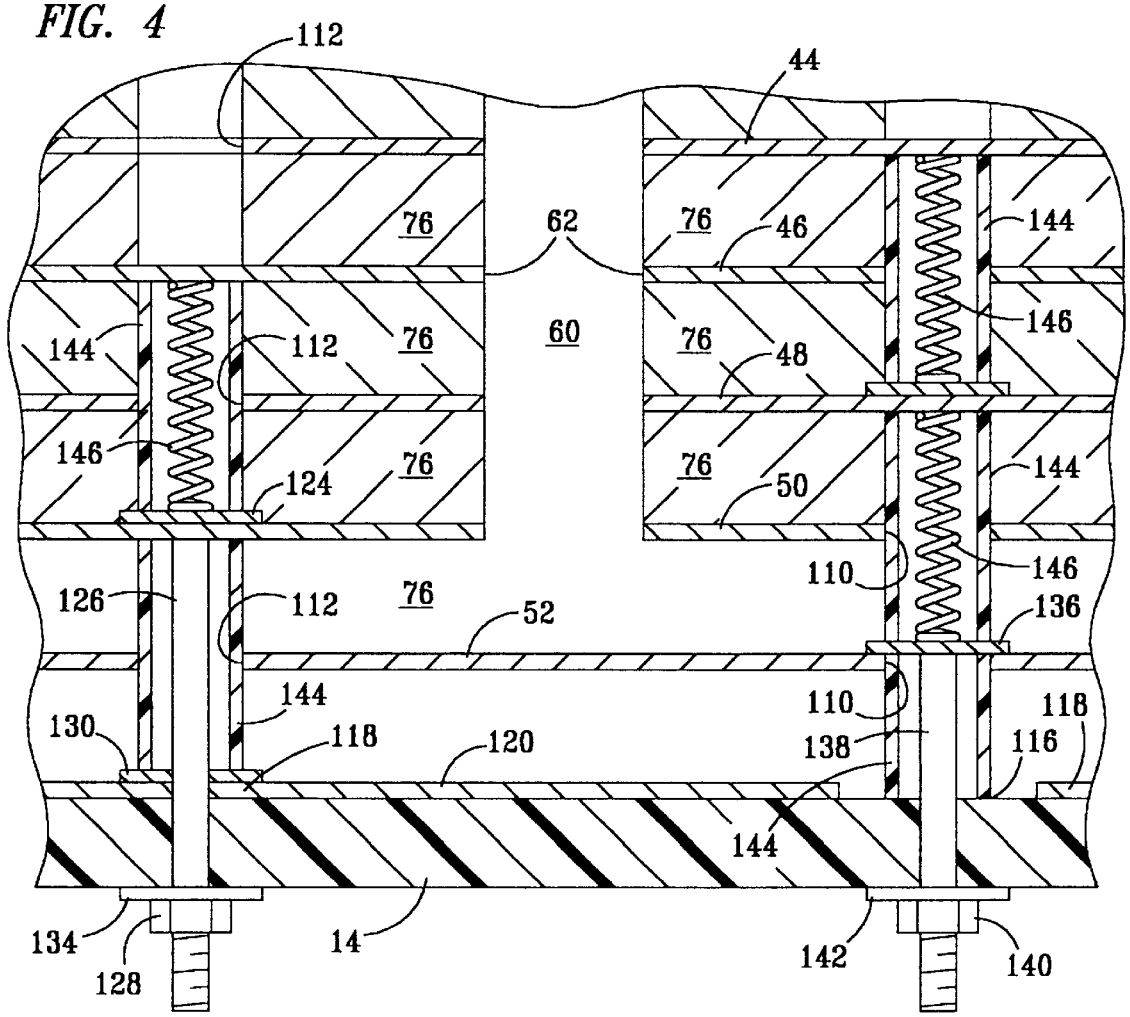
FIG. 4 is a schematic diagram showing the electrical contacting system used to maintain the alternating positive-negative-positive voltage on the electrode plates in the electrostatic filter of FIG. 1.

In FIG. 4, an electrical contacting system is shown. As shown, connectors are placed through first end 14. As shown, first end 14 does not include inlet 66 and various other details unnecessary to a description of the wiring arrangement. An electrode 120 is positioned on the top of the first end 14. A T-nut 124 is connected to a conductive bolt 126 which is sealingly positioned through plate 50 and extends downwardly through end 14 where it is restrained by a nut 128 and a washer 134. A dielectric tube 144 extends upwardly from a contact plate 130 to the bottom of electrode plate 50 through opening 112 in plate 52. Above the top of T-nut 124 a non-conductive tube 144 is positioned to extend through an opening 112 in an electrode plate 48 and upwardly from the bottom of electrode plate 46. A spring contactor 146 is placed inside the dielectric tube and expands to contact the bottom of electrode plate 46 and the top of T-nut 124. Contact with subsequent plates is achieved by adding additional sections of dielectric tubing and spring contactors to alternately contact as many electrode plates as may be used. The required voltage can be supplied via conductive bolt 126, contact plate 130 or both. With respect to the right-hand portion of FIG. 4, a T-nut 136 and a bolt 138 are used to achieve contact with electrode plate 52. Please note that electrode 120 does not contact non-conductive tube 144 in the vicinity of T-nut 136 or downwardly extending conductive bolt 13 S. Bolt 138 is sealingly positioned through first end 14 and is maintained in position by a nut 140 and a washer 142.

Above the top of T-nut 136, a dielectric tube 144 and a spring contactor 146 are used to contact the top of T-nut 136 and the bottom of electrode plate 48 with a second dielectric tube and a second spring contactor 146 being used to achieve contact with the top of electrode plate 48 and the bottom of electrode plate 44. By this arrangement, any number of electrode plates can readily be contacted by using the springs to achieve contact between the top of the previous electrode plate of the same polarity and the bottom of the next electrode plate of the same polarity.

There are numerous ways of achieving satisfactory electrical contact with the plates, for instance, contacting methods such as used in the patents referred to in the description of the background of the prior art could also be used. The particular method selected is not critical to the practice of applicant's claimed invention.

In some instances, contaminated dielectric fluids may contain sufficient water to present a problem when using electrostatic filters. In such instances, it is necessary to remove the water to a level compatible with the efficient operation of the electrostatic filter. Generally it is desirable to reduce the water level to a value less than about 50 parts per million by weight (ppmw) prior to passing the contaminated dielectric fluid through the electrostatic filter. One way of removing such water is the use of water-removal filters such as an absorbent polymer filter. Absorbent polymer filters are well known to those skilled in the art. A schematic diagram of one embodiment of an absorbent polymer filter has been shown in FIG. 5.

In FIG. 5, an absorbent polymer filter 200 is shown having an outer wall 202, a first end 204, a second end 206, and an inlet 208. The flow of water-contaminated dielectric fluid into filter 200 through inlet 208 is shown by arrow 210 as directed by distributor 212. The flow is directed upwardly and around the outside of an absorbent polymer filter 214. The dielectric fluid then flows through absorbent polymer filter 214 with the water being retained by the absorbent polymer filter. The dielectric fluid having a reduced water content is then recovered in collector tube 216 and flows to outlet 220. The operation of such filters and the use of absorbent polymer filters are well known to those skilled in the art and as such form no part of applicant's invention except in combination with applicant's claimed electrostatic filter and the claimed methods for the combined removal of water and particulate solids. One such filter is marketed by Velcon Filters, Inc., 4525 Centennial Blvd., Colorado Springs, Colo. 80919-3350.

Figure 6:
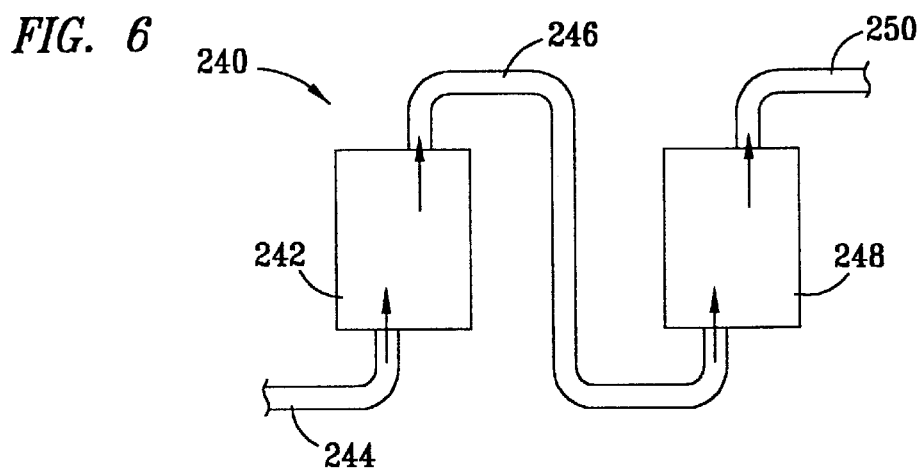
FIG. 6 is a schematic diagram of a filter system for the removal of both water and particulates from a dielectric fluid.

In FIG. 6, a combined system for the removal of water and particulate solids and other contaminants is shown. A water contaminated dielectric fluid is passed in a line 244 to a water-reduction filter 242. In filter 242 the water content of the dielectric fluid is reduced with the water-reduced dielectric fluid then being recovered via a line 246 and passed to an electrostatic filter 248. In electrostatic filter 248 particulates and other contaminants are removed with the filtered dielectric fluid being recovered through an outlet 250.

Figure 7:
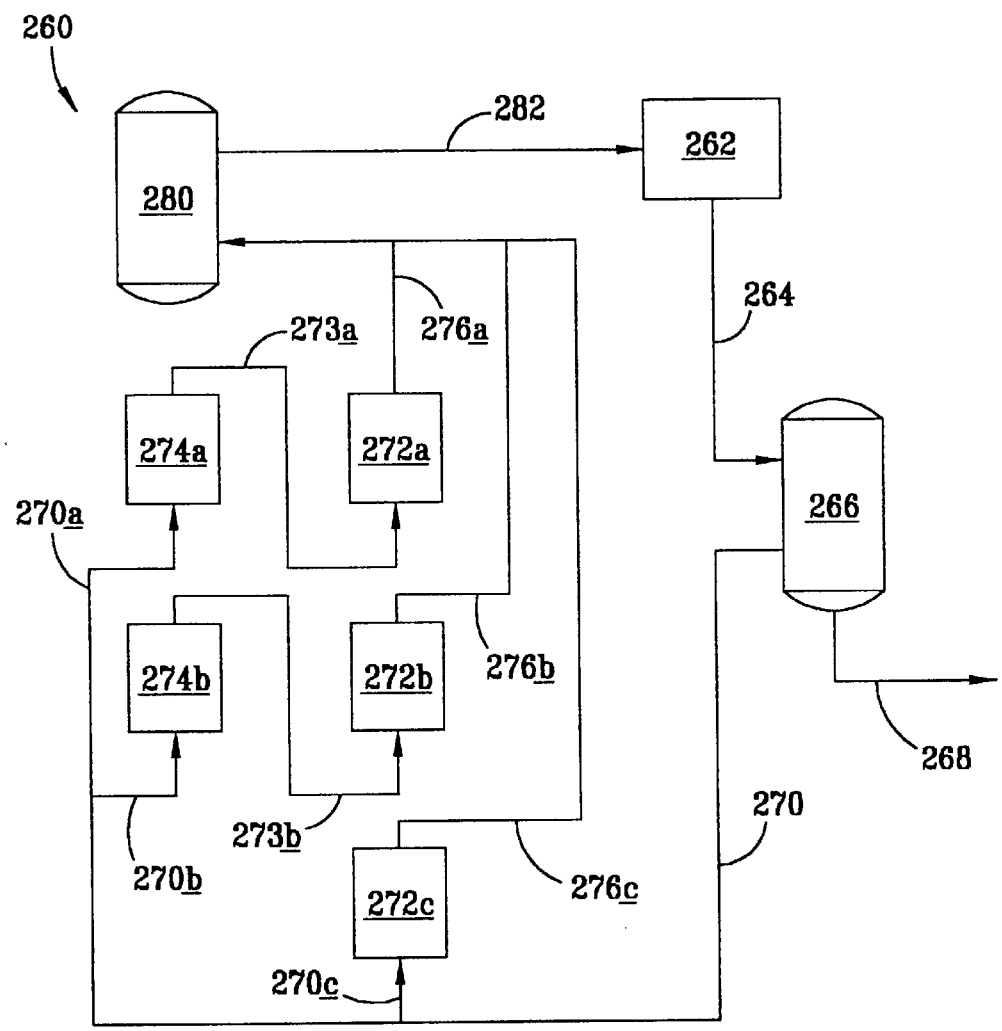
FIG. 7 is a schematic diagram of a system for providing a continuous supply of filtered dielectric fluid to a dielectric fluid user.

In FIG. 7, a filtration system for use by a user 262 of filtered dielectric fluid is shown. Such users may be turbines or other machines that require substantial quantities of lubricating oil on a continuous basis or the like. The user discharges a contaminated dielectric fluid through a line 264, which is passed to a storage tank 266 where portions of any water contaminant may be separated by settling and decanting through a line 268. The contaminated dielectric fluid is then passed though a line 270 to filtration. In a water-removal filter 274a a portion of a water-contaminated dielectric fluid stream from a line 270a may be filtered to remove the water. The water-reduced dielectric fluid is then passed though a line 273a to an electrostatic filter 272a from which a cleaned dielectric fluid is recovered through a line 276a and passed to filtered dielectric fluid storage in a tank 280. A second set of a water-reduction filter 274b and an electrostatic filter 272b is supplied via a line 270b. The cleaned dielectric fluid is recovered from electrostatic filter 272b through a line 276b and passed to storage 280 via a line 276b. A third filtration system is shown with the contaminated dielectric fluid being passed via a line 270c to an electrostatic filter 272c with the filtered dielectric fluid passing through a line 276c to storage 280. The third embodiment as shown by the use of electrostatic filter 272c alone would be used in the event it is not necessary to reduce the water content of the contaminated dielectric fluid prior to charging it to the electrostatic filter. In any event, one or a plurality of filters or filter sets are used so that one or more of the filters or filter sets can be removed from service for maintenance or for any other reason. The flow of fluid to user 262 is not disrupted since there are two storage tanks in this system which can even the flow and permit adjustments to the filtering system based upon surges in the flow, changes in the contaminants, needs for maintenance, and the like.

Figure 8:
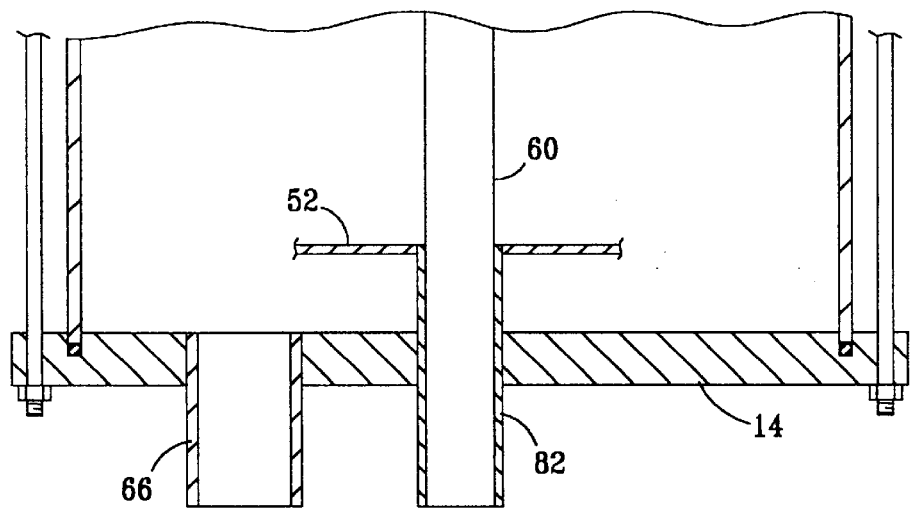
FIG. 8 is a simplified schematic diagram of an alternate embodiment of the electrostatic filter shown in FIG. 1.

In FIG. 8, a variation of the filter configuration shown in FIG. 1 is shown. Only the portion of the Figure which has been changed will be discussed. Inlet 66 has been moved to one side of first end 14. The flow of fluid is still readily achieved upwardly in the fluid inlet passageway 54 for the operation of filter 10 as discussed in FIG. 1. Alternatively, a downcomer is positioned through plate 52 so that the filtered dielectric fluid can be recovered through first end 14 of filter 10. It may be desirable in some instances to both charge and recover the dielectric fluid from the same end of the filter. With the design of the present invention, such is possible with only slight variations. The common components of the filter shown in FIG. 9 and the filter shown in FIG. 1 are numbered the same.

Figure 9:
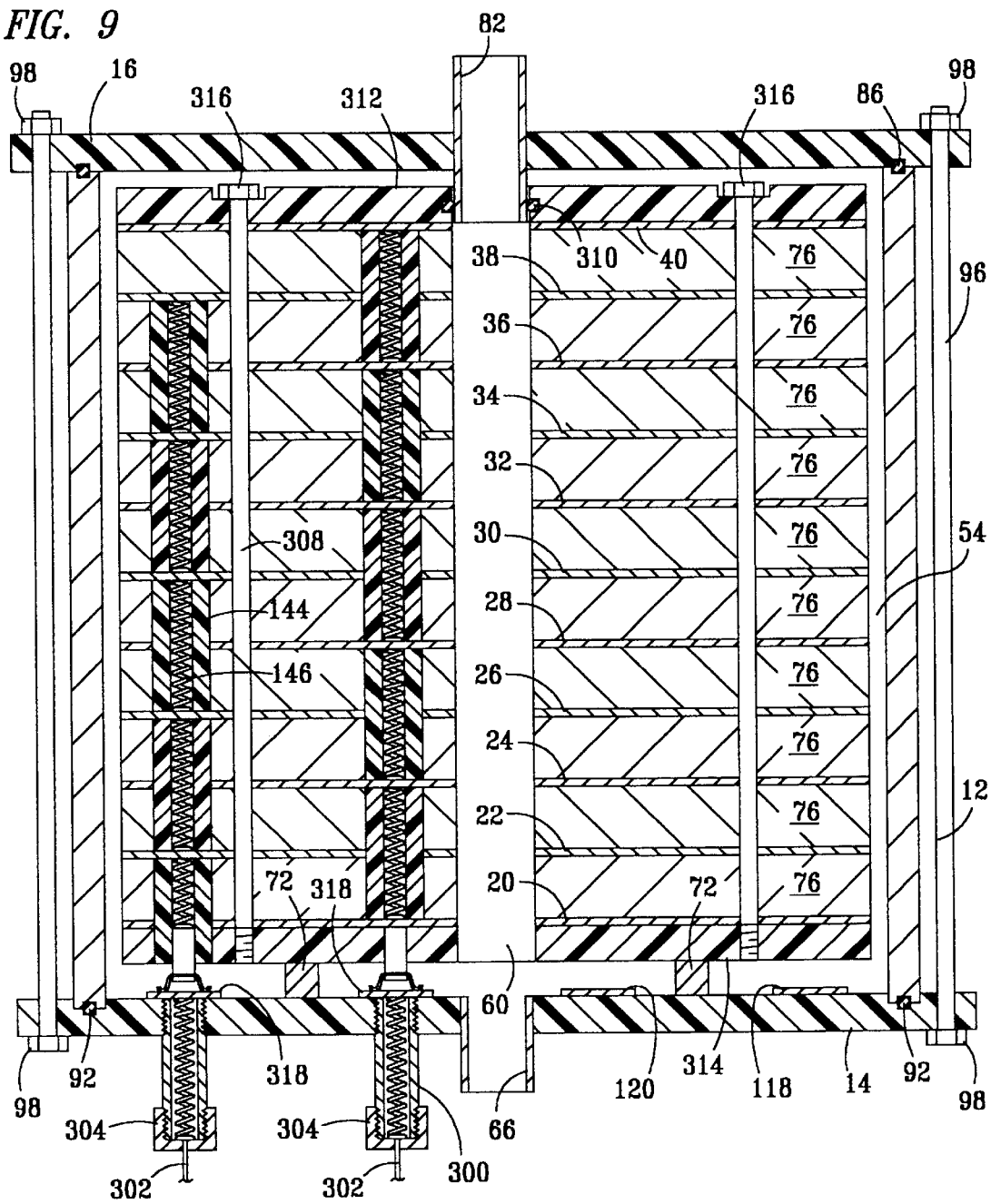
FIG. 9 is a schematic diagram of an alternate embodiment of the electrostatic filter including a filter cartridge.

The construction of the filter chamber is somewhat different in FIG. 9. In particular, outer wall 12 is positioned in first end 14 by O-rings 92, as shown, rather than as shown in FIG. 1. Similarly, the top of outer wall 12 is maintained in sealing engagement with second end 16 by O-rings positioned between the top of outer wall 12 and second end 16. In this embodiment, a cartridge is used to position the electrode plates and the filter media in the filter. A top dielectric plate 312 and a bottom dielectric plate 314 are used to contain the cartridge components. Top plate 312 and bottom plate 314 are retained in position by retaining rods 308 which may be used in any convenient number to retain top plate 312 and bottom plate 314 in position. A fitting such as a nut, bolt or the like is positioned on the top of retaining rods 308, with rods 308 being shown as screwed into a receiving threaded opening in bottom plate 314. The cartridge is supported on supports 72 and engages generally circular electrical contacts 118 and 120 positioned on first end 14 of the filter. Electrical connectors ending in contact plates 318 are positioned on both the negative and the positive conductor springs or other conductive systems used to provide D.C. electrical voltage to the electrode plates 20 through 40 so that the electrode plates are alternately positively and negatively charged. Filter media 76 is positioned between each pair of electrode plates, as discussed in conjunction with FIG. 1 and fluid flows around the outside of the cartridge, as described in conjunction with FIG. 1, through an inlet fluid passageway 54, through filter media 76 and into passageway 60. The operation of the filter in FIG. 9 is the same as the filter in FIG. 1 except that a replaceable cartridge is used. An O-ring 310 is positioned around outlet 82 to present the passage of fluid between top plate 312 and the outside of a tube forming outlet 82. The cartridge can be of a variety of configurations provided that the configurations are effective to maintain the plates and the media between the plates in proper relationship as the cartridge is transported, installed in the filter and the like. Suitable connectors as shown are positioned on the bottom of the filter cartridge so that it can be positioned in the filter by simply removing second end 16 and removing the existing filter cartridge and substituting a new filter cartridge. The filter cartridge is readily positioned in engagement with electrodes 118 and 120 by gravity, although if necessary, elastomeric spacers, not shown, or the like may be positioned between the bottom of second end 16 and the top of plate 312. The elastomeric members may be then compressed to ensure that the cartridge is pressed downwardly into electrical contact with conductors 120 and 118. As noted previously, the operation of the filter in FIG. 9 is substantially the same as that of the filter in FIG. 1. In other words, liquid flows inwardly through the inlet 54 between the top of first end 14 and the bottom of plate 314 and up through an inlet fluid passage 54 and then axially inwardly through the filter media to a central passageway 60 through which the filtered dielectric fluid passes out through outlet 82. Contact with conductors 118 and 120 is achieved by the use of screw connectors 302 which are engaged in a connector cap 304 to conductive buses 318 which contact conductors 118 and 120.

Figure 10:
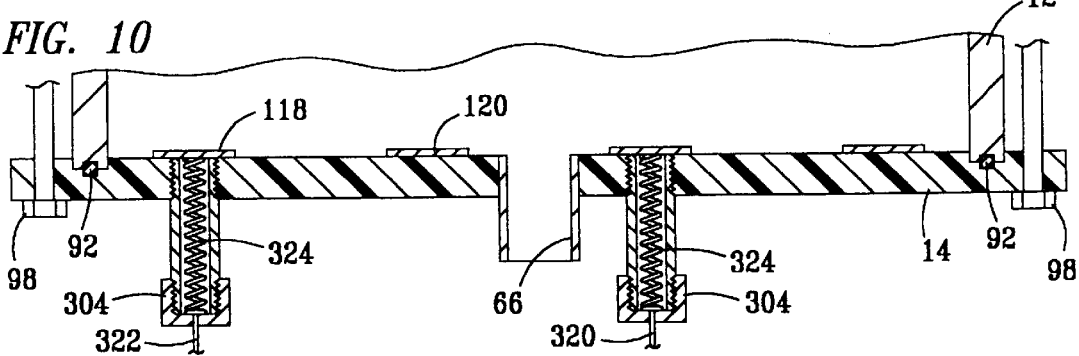
FIG. 10 is a schematic diagram of an alternate system for supplying a high voltage electrical contact to the electrode plates.

In FIG. 10, the electrical power supply to the filter shown in FIG. 9 is shown in more detail. High negative D.C. voltage is supplied to the filter via a line 320 with high positive D.C. voltage being supplied to the filter via a line 322. Cap conductors 304 are used to electrically engage conductors 320 and 322 with spring bus conductors 324 to conduct high positive voltage to electrical contact 120 with high negative voltage being supplied through contact 120. As indicated, contacts 118 and 120 are circular conductors positioned on the bottom of the filter so that when the filter cartridge is dropped into the filter, contacts 318 immediately contact a positive and a negative contact. The polarity of the plates is shown in FIG. 9 by small pluses and minuses positioned beside the plates inside passageway 60 on the drawing. As noted previously, a variety of arrangements are possible for providing electrical power alternately to the electrode plates in the filter cartridge and in the filter.

While not shown, fluid may be charged to filter 10 through outer wall 12 if desired. Suitable accommodation must be made for an inlet opening and the like, but the functioning of the filter is no way affected by charging the fluid through the side wall or from second end 16.

The filter media used is selected to have a pore size consistent with the types of particulates that are to be removed and the size of particulates, which are desirably removed. The filter media desirably comprises a dielectric material capable of accepting a D.C. electric charge such as reticulated foam, paper, fiberglass, polyester, cotton, zeolite and the like. The ideal media should capture and retain the desired level of particulate matter, but maintain a very low differential pressure. Desirably the differential pressure will be no more than about 1 to about 2 pounds per square inch (psi) across the filter. Reticulated foam pore openings, for example, may range from about 20 to about 100 pores per inch, offering a number of choices for any given application.

The filter media sections have several important functions. They provide proper electrode spacing to ensure that the applied voltage is not sufficient to result in shorting between plates. They are desirably capable of accepting a D.C. charge, provide cartridge integrity, and must capture and retain sub-micron particles. The filter media section thicknesses are determined by the voltage, electrode spacing, dielectric strength of the filter media and the desired end results of the filtering process. Typically, the media thickness is from about 1.0 to about 1.5 inches when suitable voltages are used. Typically, the voltage is from about 15,000 to about 17,500 D.C. volts.

The dielectric material may also comprise materials such as zeolite, which is useful to remove materials such as odorous compounds and the like. The zeolite may be used as such as the filter media or may be sprayed on another material to provide the desired removal while also achieving the desired filtration.

Clearly the filter of the present invention will eventually become loaded with captured particulates and other contaminants and require replacement. The replacement filter cartridge basically comprises the arrangement of plates and filter media as shown in FIG. 9. Desirably the filter cartridge is held in contact by a plurality of nonconductive restraining members positioned as shown to hold the plates and filter media in a proper orientation during shipment and installation. The replacement of the filter cartridges is readily accomplished by simply assembling them as shown in FIG. 9 for ready removal and replacement.

The replacement of the filters is then relatively simple since by removing the nuts 98 as shown in FIG. 9, second end 16 can be removed and the filter cartridge removed and replaced. The use of filter cartridges eliminates the need to assemble the filter element components in place. The top plate in the cartridge may contain a sealing material on its surface, or a sealing member for positioning between plate 19 in FIG. 1 and second end 16 to prevent leakage between plate 19 and second end 16, or a seal as shown in FIG. 9. The installation is readily accomplished by simply reversing this procedure for removing the previous cartridge from the unit.

With such voltages desirably the filter media is at least 1.0 inches thick. The filter of the present invention has been effective to remove 99.9999 percent of particulate matter above two microns from dielectric fluids. This is believed to be a result of the synergistic cooperation between the charged electrode plates and the filter media which also bears an electrical charge resulting in the removal of particles smaller than the pore diameters in the filter medium.

While not shown in FIG. 1, optionally a filter media section can be positioned around the outside of the plates and filter media sections to eliminate the entry of coarse particulates into the filter media sections 76.

Having thus described the present invention by reference to its preferred embodiments, it is respectfully pointed out that the embodiments discussed are illustrative rather than limiting in nature and that many variations and modifications are possible within the scope of the present invention. Such variations and modifications may appear obvious and desirable to those skilled in the art based upon a review of the foregoing description of preferred embodiments.

What is claimed is:

1. A method for removing the contaminants from a dielectric fluid, the method consisting essentially of:
    a) positioning alternately oppositely chargeable, electrically conductive electrode plates in a filtration chamber,
    b) positioning a filtration media section containing a filtration media having an outer surface between each pair of the electrode plates;
    c) imposing an alternately opposite electrical voltage on the electrode plates;
    d) charging the fluid to an inlet fluid passageway outside the outer surface of the filtration media in the filtration chamber;
    e) passing the fluid directly from the inlet fluid passageway into the filtration media; and,
    f) passing the fluid radially inwardly from the inlet fluid passageway through the filtration media and between the plates to a filtered fluid collection zone.

2. The method of claim 1 wherein the fluid is filtered to remove water prior to charging the fluid to the inlet fluid passageway.

3. The method of claim 1 wherein the filtration media comprises a reticulated foam.

4. The method of claim 1 wherein a plurality of charged plates and filtration media sections are used.

5. The method of claim 1 wherein the electrode plates are not perforated.

6. The method of claim 1 wherein the electrode plates comprise electrode screens.

* * * * *